United States Patent [19]

Dal Monte

[11] Patent Number: 5,145,232
[45] Date of Patent: Sep. 8, 1992

[54] SEAT FOR VEHICLES, PARTICULARLY MOTOR CARS

[75] Inventor: Antonio Dal Monte, Rome, Italy
[73] Assignee: Fiat Auto SpA, Italy
[21] Appl. No.: 776,859
[22] Filed: Oct. 16, 1991

Related U.S. Application Data

[63] Continuation of Ser. No. 537,728, Jun. 14, 1990, abandoned.

[30] Foreign Application Priority Data

Jun. 14, 1989 [IT] Italy .................. 67482 A/89

[51] Int. Cl.⁵ ............................... B60N 2/02
[52] U.S. Cl. ............................ 297/329; 297/327; 297/313; 297/330; 297/322
[58] Field of Search ............. 297/329, 327, 313, 330, 297/322, DIG. 1

[56] References Cited

U.S. PATENT DOCUMENTS 3,037,735 6/1962 Matthews ................. 248/394
4,767,156 8/1966 Yamada et al. ............ 297/313
4,795,215 1/1989 Shimada .................... 297/455

FOREIGN PATENT DOCUMENTS 0238234 9/1987 European Pat. Off. .
2945559 5/1981 Fed. Rep. of Germany .
3437962 4/1986 Fed. Rep. of Germany .
643794 6/1962 Italy ........................ 297/327

Primary Examiner—James R. Brittain
Assistant Examiner—Milton Nelson, Jr.
Attorney, Agent, or Firm—Sughrue, Mion, Zinn, Macpeak & Seas

[57] ABSTRACT

The squab of the seat is supported at its front and rear regions and by responsive support arms. The lower ends of the arms are mounted on the free ends of respective pivoted elements whose positions are adjustable selectively so as to enable the seat to be adjusted more precisely to the anthropometric characteristics of its occupant, the whole considerably reducing the vertical bulk of the squab and of the seat as a whole.

6 Claims, 3 Drawing Sheets

SEAT FOR VEHICLES, PARTICULARLY MOTOR CARS

This is a continuation of application No. 07/537,728 filed Jun. 14, 1990, and abandoned Oct. 16, 1991.

BACKGROUND OF THE INVENTION

The present invention relates to seats for vehicles, for example motor cars. The invention relates particularly to a seat of the kind disclosed, for example, in European patent application No. EP-A 0 310 572 in the name of the same Applicant.

Likewise known (for example from Italian application No. 67018-A/88, also in the name of the Applicant) are seats which, together with an adjustment movement generally longitudinally of the passenger compartment of the motor vehicle, can perform a simultaneous lowering-raising movement which affects the squab as a whole either uniformly, or differently at the front and rear ends or regions of the squab. This movement is accompanied by a coordinated movement of the backrest and side plates which, simultaneously or alternatively depending on the specific requirements of use, provides a series of advantages, such as: - maintaining the line of sight of the person occupying the seat at an almost constant level, whatever the longitudinal position of adjustment of the seat, - varying the length of the seat surface of the squab and consequently avoiding problems such as that currently known as "suspended limb" or inadequate support of the thighs of the seat occupant, and - correctly supporting the back of the seat occupant, particularly as regards the lumbosacral region.

Naturally, the adaption of the seat to the anthropometric characteristics and/or tastes of the seat occupant can be made more precise the greater the ability of the various elements forming the seat to move separately. Increases in the possible separate movements of the seat parts can, however, create confusion, particularly for people who do not have a good spatial sense and who have a particular sensitivity to their own body mechanics, and who form the large majority of the motoring population.

Moreover, the need to provide a seat which can be adapted precisely to the characteristics and tastes of the occupant conflicts, to a certain extent, with the need to reduce its overall bulk. This need is particularly marked in sports cars, especially those of high class and performance. The floors of the passenger compartments of such cars usually have rather uneven structures due to the presence of stiffening ribs, cross members, etc.

SUMMARY OF THE INVENTION

The object of the present invention is to provide a seat of the type specified above which, whilst retaining excellent adaptability to the characteristics and tastes of the occupant, has, on the one hand, a considerably reduced vertical bulk (thickness of the squab and of the elements associated therewith), particularly as regards the lowering of the so-called H point, and which, at the same time, avoids giving rise to confusion due to the presence of an excessively complicated adjustment system.

According to the present invention, this object is achieved by virtue of a seat which has the characteristics quoted specifically in the claims which follow.

The Applicant has found that a seat according to the invention enables the so-called H-point to be lowered by approximately 10 cm when the reduction in the vertical bulk of the squab-adjustment mechanism resulting from the main characteristics of the invention is accompanied by the use, for the production of the squab itself, of a thin layered (multi-layer) structure, for example of the type described in the previous European patent application No. EP-A 0 363 330 in the name of the same Applicant.

Moreover, the reduction in the vertical bulk is achieved whilst the original floor space is completely retained (in an Alfa Romeo 164 motor car, in a solution found particularly advantageous) and with the use of the same fixing points for the seat as are used in cars currently produced.

The use of a seat according to the invention has been found particularly advantageous both for the driver of the motor vehicle and for the passenger who sits beside the driver. This is due, in particular, to the fact that the passenger is offered the ability to raise the front region of the squab quite considerably until a particularly agreeable and relaxing position is reached.

Essentially, the solution according to the invention provides the possibility of a coordinated longitudinal and vertical movement of the front and rear regions of the squab (and of the backrest) of the seat such as to enable the seat occupant to effect an initial, rough adjustment of the attitude of the seat so as to bring it closer to his own anthropometric characteristics and driving or travelling tastes. When this initial adjustment has been made, two fine-adjustment controls can then be operated so as to vary the positions of the front region and of the rear region of the squab until a completely satisfactory adjusted position is reached.

The backrest and side plates preferably moves on a conventional slide structure whose strengthin stress tests is well known.

The solution according to the invention is also favourable as regards the insertion of the feet of the persons occupying the rear seats, even transversely, which facilitates their getting into and out of the vehicle.

BRIEF DESCRIPTION OF THE DRAWINGS

The invention will now be described, purely by way of non-limiting example, with reference to the appended drawings.

DETAILED DESCRIPTION OF THE INVENTION

Figure 1:
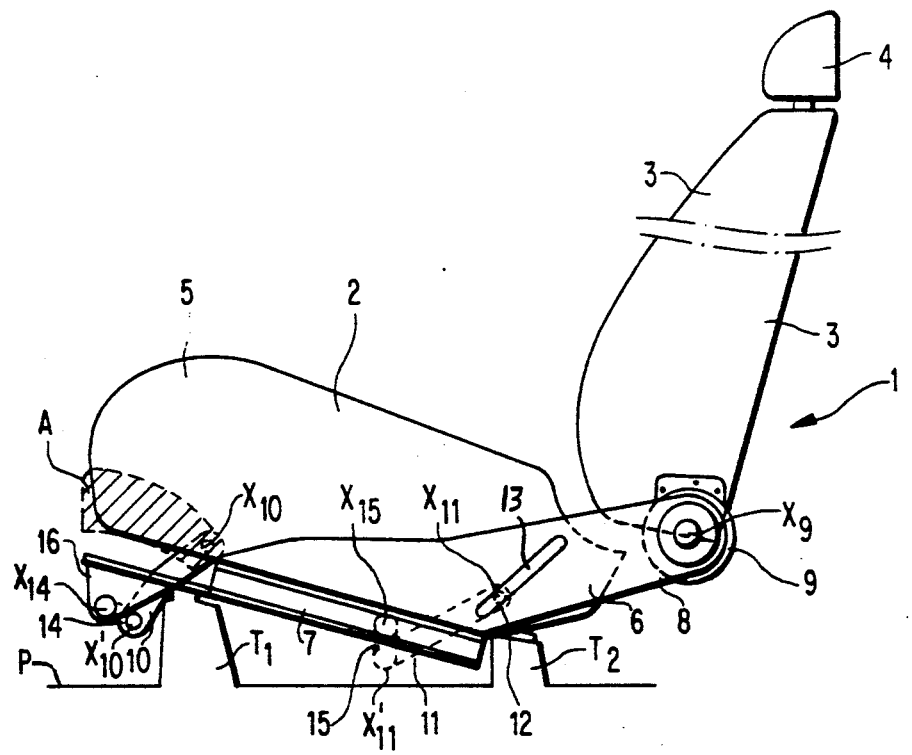
FIG. 1 is a side elevation view showing the present invention.

In FIG. 1, a motor-vehicle seat (for example the driver's seat of a motor car) is generally indicated 1 and is intended for fixing to the floor P of the motor vehicle (not shown as a whole) and comprises essentially three elements, that is to say:

a generally horizontal seat element 2 defined below for brevity as the "squab", a backrest 3 for supporting the back of the seat occupant, and a headrest element 4 situated at the upper end of the backrest 3.

In general, the squab 2 can be seen to include a front region 5 and a rear region 6 the terms "front" and "rear" referring to the normal direction of travel of the motor vehicle, In order to fix the seat 1 to the floor P of the passenger compartment, the provision is generally envisaged of two parallel guides 7 (only one of which is visible in the drawings) which are fixed to the floor P, for example to a pair of transverse ribs $T_1$, $T_2$ thereof, so as to extend approximately horizontally, usually with their front ends located in higher positions than their rear ends. Two side plates 8 (of which, again, only one is visible in the FIGS. 1, 2, 4 and 5, that is the one situated on the left hand side of the seat 1) are slidably mounted on the guides 7 and extend generally upwardly and rearwardly so as to form support arms proper for the lower end of the backrest 3.

An articulation and adjustment mechanism 9 (of known type) is situated between the free end of the plate 8 and the lower end of the backrest 3 and enables a general adjustment movement to be imparted selectively to the backrest 3 to make it pivot forwards and backwards about a respective axis $X_9$ which is horizontal in the arrangement of use and is defined by the mechanism 9.

Figure 3:
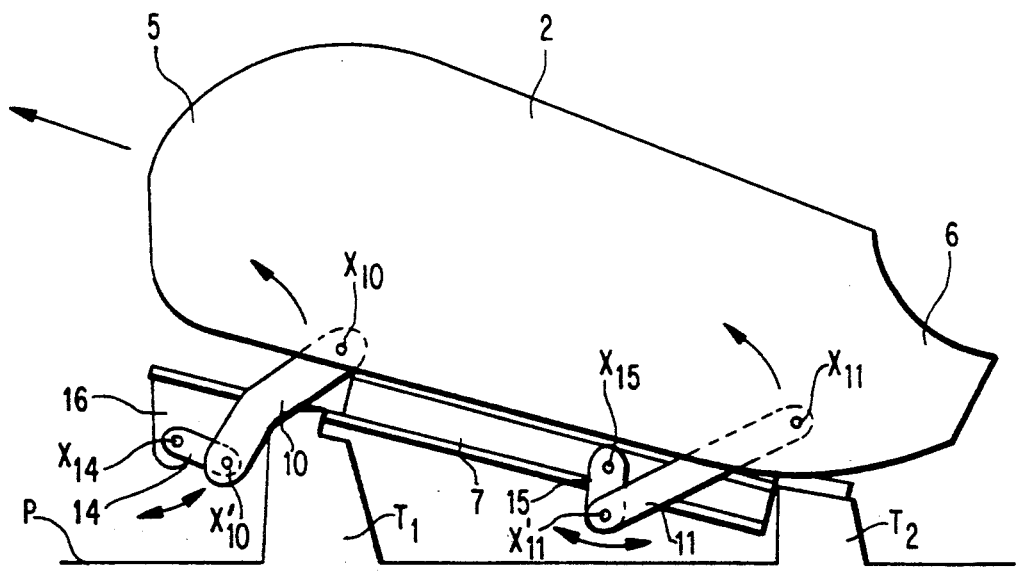
FIG. 3 is a side elevation view isolating the adjustment elements and support elements in relation to the squab.

The front region 5 and the rear region 6 of the squab 2 are supported by respective pairs of support arms 10 and 11 (see FIG. 3). Again, only the support arms located on one side of the seat are visible in the drawings.

The arms 10 and 11 are articulated to the squab 2 at their upper ends at points which are generally fixed relative to the squab 2.

More precisely, the upper ends of the front arms 10 are articulated, to the squab 2 about a horizontal axis $X_{10}$ whilst the upper ends of the rear arms 11 are articulated to the squab about a respective horizontal axis $X_{11}$ as shown in FIG. 3.

Figure 2:
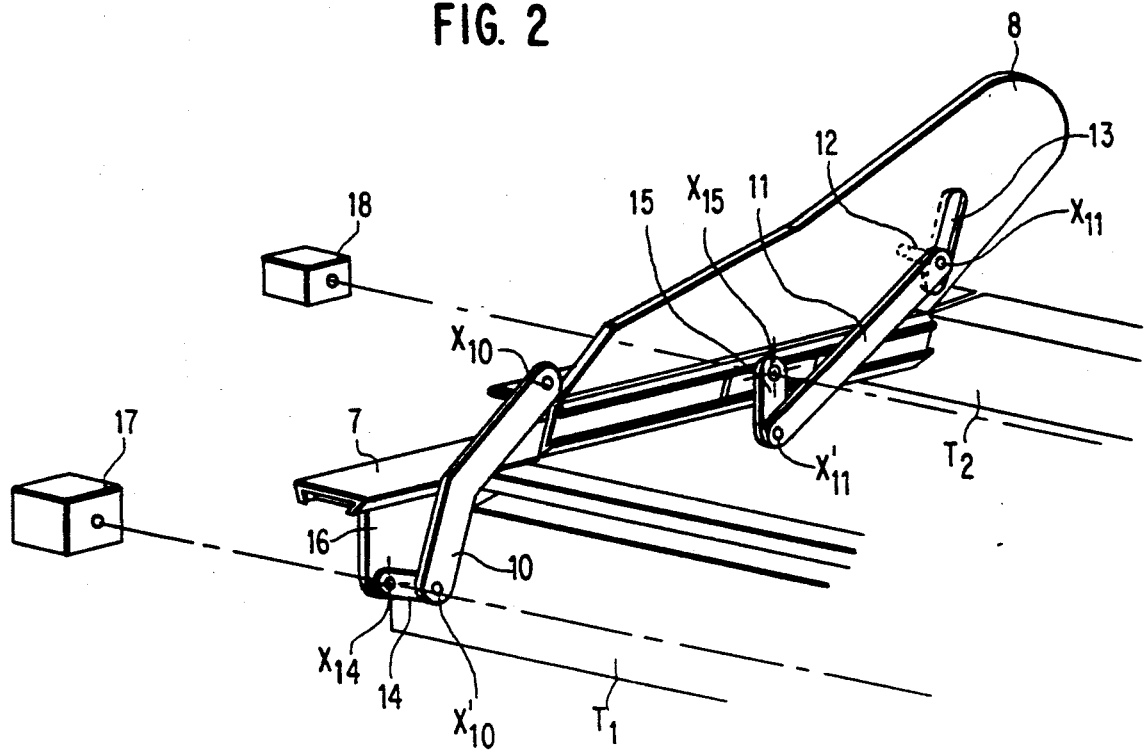
FIG. 2 is an isometric view of the invention of FIG. 1.

In correspondence with the latter axis, the upper ends of the arms 11 have respective pins 12 slidably engaged in slots 13 provided in the corresponding plates 8 as shown in FIG 2.

The slot 13 extends in a generally straight line from a front end to a rear end in a generally inclined arrangement with its, front end located in a lower position than its rear end as in FIG. 1.

Figure 4:
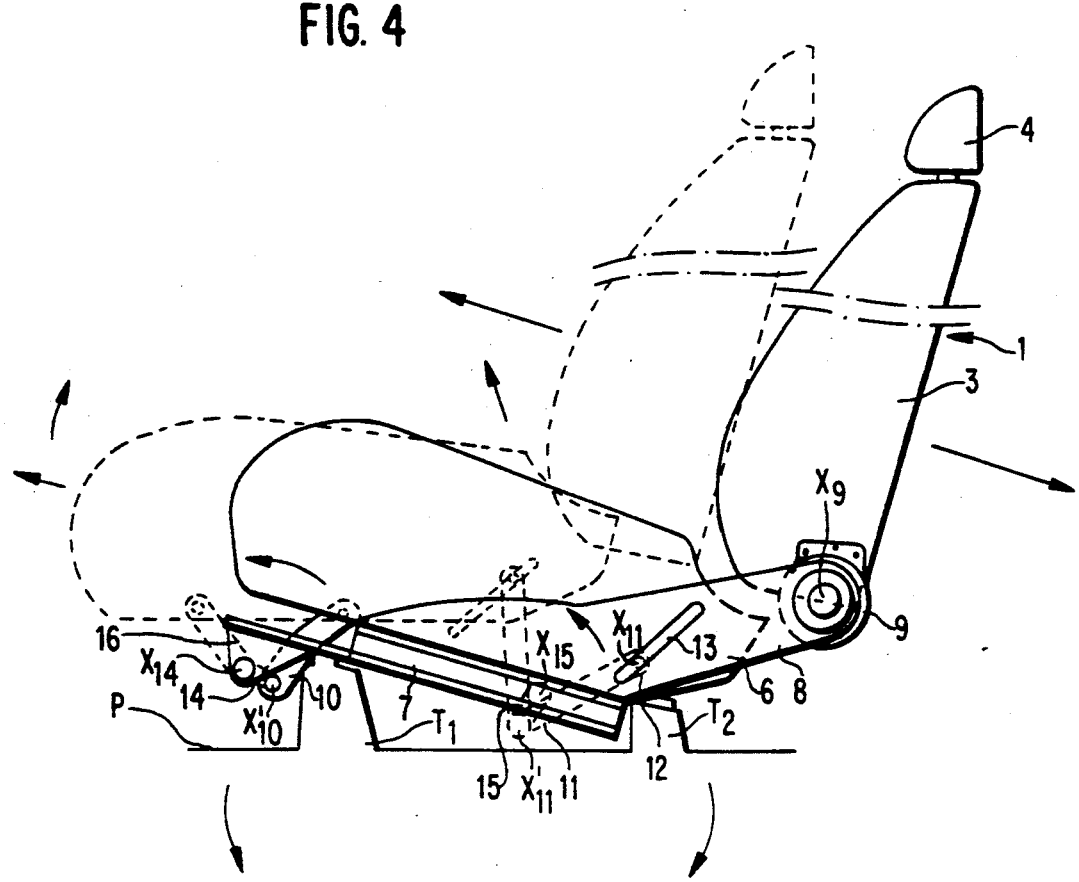
FIG. 4 is a side elevation view illustrating the movement of the vehicle seat in dashed lines in response to forward translation of the vehicle seat.
Figure 5:
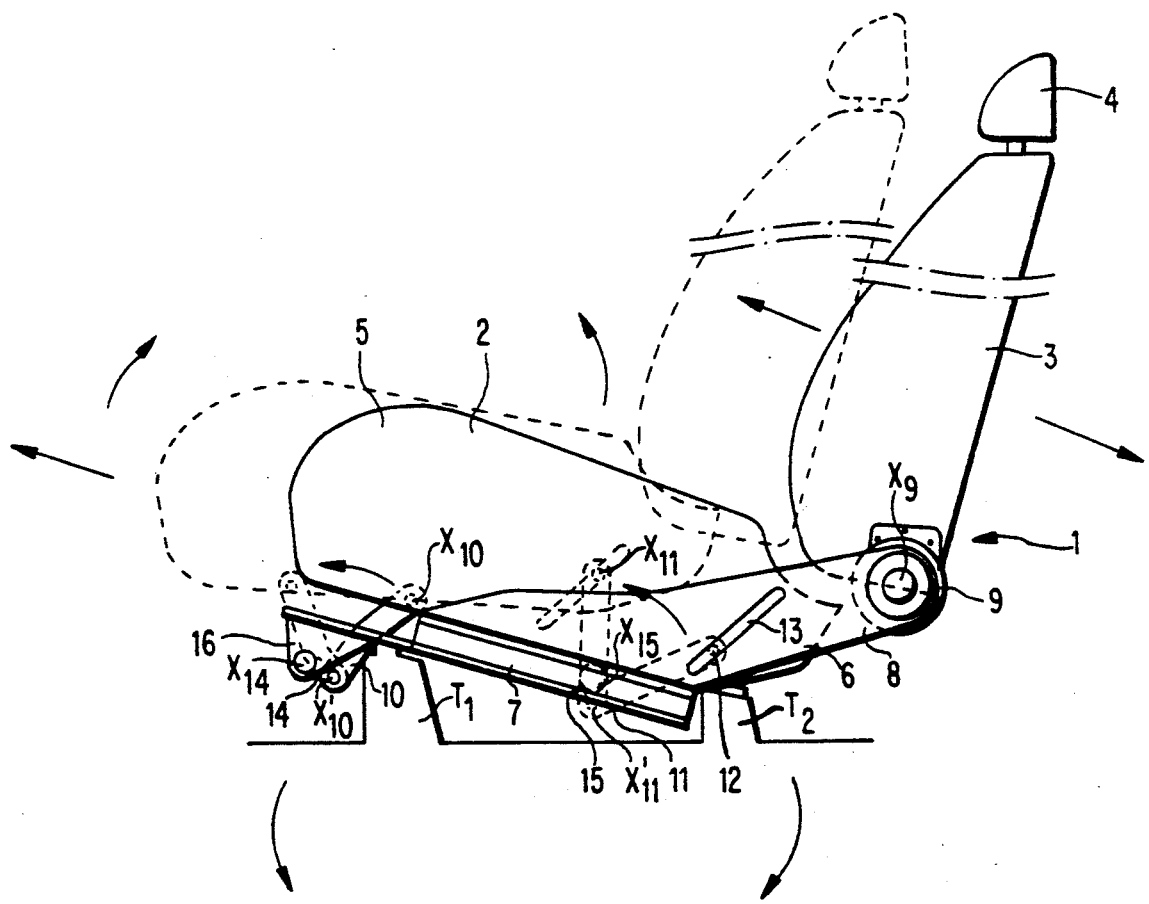
FIG. 5 is a side elevation view illustrating the movement of the vehicle seat in dashed lines in response to forward translation of the vehicle seat with the adjustment elements in a different position than in FIG. 4.

The pin 12 and the slot 13 thus constitute ramp coupling means which, when the plates 8 are slid along the guides 7 to adjust the longitudinal position of the backrest 3 (after the release of locking means—not shown—which hold the seat 1 in a fixed position in the normal conditions of use), cause the rear region 6 of the squab 2 to move vertically as well as causing a general forward-rearward translational movement relative to the passenger compartment as shown in FIG. 4 and 5.

More precisely, when the backrest 3 and side plates are moved forwards, the squab 2 also moves forwards with a general pivoting and translational movement which causes the rear region 6 to rise towards the lower end of the backrest 3 (see the broken outline in FIGS. 4 and 5).

In a complementary manner, when the backrest and side plates 8 are moved backwards again, the squab 2 also moves back, simultaneously performing a rearward tilting movement which lowers the rear region 6 relative to the backrest 3.

This combined translational-pivoting movement of the squab 2 is intended to enable the seat to be adapted more precisely to the anthropometric characteristics of its occupant.

In particular, when the seat 1 is moved forwards (for example to accommodate a small driver or passenger) the raising of the rear region 6 of the squab enables the line of sight of the seat occupant to be kept approximately unaltered.

Conversely, in the case of a tall person, the rearward movement of the seat 1 also involves a lowering of its rear region 6. The line of sight is therefore also substantially maintained in this case.

Moreover, the vertical adjustment of the rear region 6 of the squab relative to the backrest 3 ensures adequate support for the lumbosacral region of the seat occupant in all cases.

As already stated, the squab 2 is preferably made with a generally layered structure of the type described in European patent application No. EP A 0 368 330 in the name of the same Applicant.

The translational-height variation movement of the rear region 6 of the squab 2 is caused by the pivoting of the arms 11 about a respective lower articulation axis $X_{11}$, as in FIG. 3, whose position is variable selectively according to criteria which will be described more fully below.

The movement of the front region 5 of the squab 2 which results from the general translation of the seat is also guided by the pivoting of the arms 10 about a lower articulation axis $X_{10}'$ as in FIG. 3.

The position of this latter axis is also adjustable selectively according to criteria which will be described more fully below.

In general, the rear arms 11 are oriented with their lower articulation axis $X_{11}'$ located in a position considerably further forward than their upper articulation axis $X_{11}$, whatever the position of adjustment of the seat.

The front arms 10 also have a substantially similar orientation, with the lower articulation axis $X_{10}'$ located in a position further forward than the upper articulation axis $X_{10}$. The general orientation of the front arms 10, however, is closer to the vertical as seen in FIG. 3.

This means that, during the overall adjustment movement for a given position of the lower articulation axis $X_{10}'$ as in FIGS. 4 and 5-the front region 5 of the squab retains an almost constant height.

The lower articulation axes $X_{10}'$ and $X_{11}'$ of the arms 10 and 11 are defined by respective pivots which connect the arms 10 and 11 to respective further front and rear adjustment elements or arms 14 and 15. These adjustment elements are articulated at the adjustment elements opposite ends, $X_{14}$ and $X_{15}$ respectively, (the adjustment elements' upper ends in normal conditions of use) to respective support elements which are movable with respect to the guides 7.

For example, the front adjustment arms 14 are mounted each at the vertex (the lower vertex in use) of a flange or bracket 16 of an element which is movable along the guide 7. As for the arrangement adopted for causing bracket 16 to slide along guide 7, any traditional solution can be resorted to; for instance by shaping the guide 7 in the form of a C profile opening downwardly, whereby bracket 16 has a foot portion sliding therein. (See FIG. 2).

A similar mounting arrangement is adopted for the rear adjustment arms 15, by means of their connection to a support element (shown in FIG. 2). Such an adjustment arm can be mounted onto guide 7 in a manner which is substantially similar to that adopted for arms 14.

The adjustment arms 14 and 15 are thus inclined generally downwardly and can pivot about respective axes $X_{14}$ and $X_{15}$ which are horizontal in use.

The arms 14 and 15 are pivoted selectively about the axes $X_{14}$ and $X_{15}$ by drive means 17 and 18 in FIG. 2, shown non-specifically since they are of known type.

They may, for example, be electric motors or may be fluid-operated, or may even be operated mechanically by the seat occupant rotating corresponding control knobs or handles projecting from the sides of the seat.

In any case, the function of the adjustment arms 14, 15 is, essentially, to vary the pivoted portions of the lower ends of the arms 10, 11 as a result of their pivoting movement. In other words, by the selective pivoting of the adjustment arms 14, 15 it is possible to vary correspondingly the positions of the axes $X_{10}'$ and $X_{11}'$ about which the arms 10 and 11 pivot (see FIG. 3).

In effect, the pivoting of the adjustment arms 14 and 15 achieves a fine adjustment of the position assumed by the front region 5 and the rear region 6 of the squab, as shown schematically in broken lines in FIGS. 4 and 5. In particular, the shaded area indicated A in FIG. 1 indicates the set of adjustment positions of the axis $X_{10}$ which can be achieved by the pivoting of the arm 10 and of the arm 14.

The person occupying the seat according to the invention can consequently adapt the seat to his requirements by means of two successive adjustments:

a first adjustment, which may be defined as a rough adjustment and is achieved by the movement of the seat 1 as a whole forwards and backwards, giving rise to the translational movement of the backrest 3 and to the corresponding translational-pivoting movement of the squab 2 described above, and a second, fine adjustment, achieved by means of the controls which pivot the adjustment arms 14 and 15 so as to vary the height (and more generally the position) of the front region 5 and the rear region 6 of the squab 2.

This is all achieved within a structure which, particularly as regards the squab 2, is extremely compact. In fact, it will be noted that the direction in which the adjustment arms 14, 15 extend relative to their main point of fixing to the structure of the vehicle (identified by the axes $X_{14}$ and $X_{15}$) is generally opposite the direction in which the corresponding pivot arms 10, 11 extend. In fact the adjustment arms 14, 15 extend downwardly from this point whilst the arms 10 and 11 which support the squab 2 extend upwardly in a generally V-shaped configuration as in FIG. 3.

This solution is found to be particularly advantageous in cases in which, as in the embodiment illustrated, the floor P of the passenger compartment is uneven as a result of the presence of stiffening formations such as the cross members $T_1$ and $T_2$. The invention in fact provides a structure for supporting and adjusting the squab (the arms 10, 11 and 14, 15) which fits, so to speak, between the cross members. This, together with the use of a thin, multilayer structure for the squab 2, enables the vertical bulk of the squab 2 to be minimised.

I claim:

1. A vehicle seat comprising a squab with a front region and a rear region, a backrest which rises above the rear region of the squab, and respective associated, selectively-pivotable support arms having upper ends and lower ends, the support arms being articulated at the upper ends to the squab and at the lower ends to respective adjustment elements which can be pivoted selectively in order to selectively vary the position of the lower articulation of the support arms; wherein the backrest is provided at its lower end with support means which can perform a generally translational movement forwards and backwards relative to the vehicle, the support means being disposed between the rear region of the squab and at least one of the support arms and having an elongated, inclined slot formed therein, further wherein the at least one support arm includes a pin at the upper end and which passes through the slot provided in the support means and is connected to the rear region of the squab, the pin and slot cooperating to form a ramp coupling means, such that the forward-rearward movement of the support means of the backrest causes a vertical translation of the rear region of the squab as well as a corresponding forward-rearward movement of the squab.

2. A seat according to claim 1, wherein the adjustment elements are also constituted by arms which extend substantially in the opposite direction from the support arms, in a generally V-shaped configuration.

3. A seat according to claim 1, wherein the elongated, inclined slot is arranged such that a front end portion is located in a generally lower position than a rear end portion thereof.

4. A seat according to claim 1, wherein the at least one support arm which is articulated to the rear region of the squab is, in all possible positions of use, arranged with its lower articulation point in a generally lower position than its upper point of articulation to the squab.

5. A seat according to claim 1 including at least one support arm which is articulated to the front region of the squab and, in all possible positions of use, is arranged with its lower articulation point located in a generally lower position than its upper articulation point.

6. A seat according to claim 5, wherein in all possible positions of adjustment, the at least one front support arm is inclined at a generally smaller angle to the vertical than the at least one rear support arm.

* * * * *